United States Patent [19]
Bodem, Jr.

[11] Patent Number: 5,388,035
[45] Date of Patent: Feb. 7, 1995

[54] AUTOMOTIVE MARKER LAMP

[75] Inventor: Jack D. Bodem, Jr., Kokomo, Ind.

[73] Assignee: Federal-Mogul Corporation, Southfield, Mich.

[21] Appl. No.: 96,342

[22] Filed: Jul. 23, 1993

[51] Int. Cl.⁶ ............................................. B60Q 1/26
[52] U.S. Cl. ......................................... 362/61; 362/240; 362/244; 362/252; 362/332; 362/800
[58] Field of Search ...................... 362/61, 80, 235, 240, 362/244, 245, 246, 249, 252, 332, 339, 800, 333

[56] References Cited

U.S. PATENT DOCUMENTS

| | | | |
|---|---|---|---|
| 1,460,834 | 7/1923 | Arbuckle | 362/337 |
| 1,663,133 | 3/1928 | Kirk | 362/61 |
| 1,896,887 | 2/1933 | Falge et al. | 362/80 |
| 2,197,226 | 4/1940 | Smith | 362/80 |
| 2,513,712 | 7/1950 | Coombs | 362/80 |
| 2,800,641 | 7/1957 | Falge et al. | 362/80 |
| 2,884,835 | 5/1959 | Rupert | 359/514 |
| 3,366,787 | 1/1968 | Kelley | 362/311 |
| 3,541,606 | 10/1967 | Heenan et al. | 359/533 |
| 4,462,068 | 7/1984 | Shadwick | 362/332 |
| 4,729,076 | 3/1988 | Masami et al. | 362/235 |
| 4,733,335 | 3/1988 | Serizawa et al. | 362/80 |
| 4,823,246 | 4/1989 | Dilouya | 362/326 |
| 4,851,810 | 7/1989 | Vitale et al. | 362/61 |
| 4,930,055 | 5/1990 | Swadell | 362/244 |
| 4,949,228 | 8/1990 | Lin et al. | 362/72 |
| 4,951,179 | 8/1990 | Machida | 362/80 |
| 5,003,443 | 3/1991 | Sabala | 362/249 |
| 5,055,983 | 10/1991 | Hunold et al. | 362/80 |
| 5,101,326 | 3/1992 | Roney | 362/61 |
| 5,174,649 | 12/1992 | Alston | 362/244 |

Primary Examiner—Ira S. Lazarus
Assistant Examiner—Alan B. Cariaso
Attorney, Agent, or Firm—Lawrence J. Shurupoff

[57] ABSTRACT

A vehicular marker lamp includes three light-emitting diodes located within a cup-shaped housing having a flat, transparent front wall or lens. Parallel V-shaped ribs in the rear surface of the lens form prisms that serve to horizontally spread the light beams emitted by the diodes. The ribs are angled differently so that the beam from each diode is spread to a different extent. A composite output beam is generated having a desired beam width and intensity. In a preferred arrangement, the width of the output beam is about 30° in the vertical plane and 90° in the horizontal plane.

9 Claims, 3 Drawing Sheets

AUTOMOTIVE MARKER LAMP

BACKGROUND OF THE INVENTION

1. Field of the Invention

The present invention relates to marker lamps used on trucks or other automotive vehicles and particularly to marker lamps using light-emitting diodes as the light source.

2. Description of Prior Developments

It has recently been proposed to use light-emitting diodes as a light source in automotive vehicle marker lamps. Such diodes have the advantage of a relatively long service life, such that, in most cases, they will remain operable for the life of the vehicle on which they are installed. For example, U.S. Pat. No. 5,101,325 to Roney discloses a marker lamp employing light-emitting diodes as a light source.

The marker lamp shown in Roney has five light-emitting diodes arranged in a line or row with the endmost diodes being divergent and acutely angled to the plane of the lamp assembly in opposite directions, and with the centermost diode extending normal to the lamp assembly plane. The other two diodes diverge from each other to a slight extent so that the five diodes have a fan-shaped pattern, as shown in FIG. 1 of the patent drawings.

The fan-shaped array of five light-emitting diodes in Roney produces a multi beam output that is relatively wide in a plane taken along the row of diodes, and relatively narrow in the transverse plane. This is apparently designed to meet a U.S. Department of Transportation requirement for an output beam that has a horizontal divergence of at least 45° in a horizontal plane and a vertical divergence of only 10°.

Prior to the present invention, it has been proposed to use rib-type prisms for spreading light beams produced by a single light source. U.S. Pat. No. 1,460,834 to Arbuckle shows an automotive headlight that includes a single light source in conjunction with a parabolic reflector 11 for directing parallel light rays against a flat lens having three sets of prism ribs at different points along the lens surface.

Another patent disclosing rib-type prisms for spreading light rays is U.S. Pat. No. 4,462,068 to Shadwick. In this case, the prisms are of incrementally varying angulations with the angulations of adjacent prism ribs differing by about 1°. The lamp construction of the Shadwick patent is designed to produce a relatively even light pattern symmetrical around the lamp central axis.

U.S. Pat. No. 3,366,787 granted to Kelley shows a lamp construction wherein at least one lens wall of the lamp housing has different groups of prism ribs arranged to compensate for different angulations of the light rays impinging on different areas of the lens wall. By selecting different prism rib angulations at different areas of the lens wall, the patentee is able to achieve parallelism in the light rays emitting by the lens wall.

U.S. Pat. No. 4,733,335 to Serizawa discloses a vehicle lamp that includes an array of light-emitting diodes aligned with a lens system having a series of individual, semi-spherical condenser lens elements and diffusion lens elements arranged to evenly diffuse the individual light beams generated by the diodes. The aim of the lens system is to produce an essentially even light intensity across the exit face of the lens system.

SUMMARY OF THE INVENTION

The present invention relates to a circular lamp construction that meets Department of Transportation regulations yet requires only three light-emitting diodes. The diodes are arranged within a circular cup-shaped lens having a flat front wall extending normal to the optical axis of each diode. The areas of the lens front wall aligned with the diodes have parallel V-shaped prism ribs formed therein, whereby the light beams generated by the diodes are spread in a plane transverse to the directions taken by the ribs. There are three sets of V-shaped prism ribs, with the ribs in each set having different included angles, so that the different emergent beams have different angulations.

The three emergent beams are combined to produce a composite beam having a reasonably constant intensity across the beam width dimension. The composite beam has an angulation of about 90° in a plane transverse to the prism ribs and an angulation of about 30° in a plane parallel to the prism ribs.

The circular lamp structure of the invention can be built as a relatively small, compact unit usable as an automotive marker lamp meeting the U.S. Department of Transportation requirements.

The light-spreading prism array is formed on the lens front wall in optical alignment with each of the light emitting diodes. Each prism in the array includes a set of parallel V-shaped ribs formed on the rear surface of the lens front wall, whereby each incident light beam is spread in a plane transverse to the directions taken by the ribs while being substantially unaffected in a plane parallel to the ribs. Each set of prism ribs have different included angles so that each set of ribs produces a different angular spreading of the incident light beam.

For example, with a light-emitting diode having a 30° conical beam and a first set of V-shaped prism ribs having half included angles of 30°, the conical beam will be spread to an output beam angulation of about 90° in a plane transverse to the direction of the ribs.

A second set of prism ribs having included half angles of 45° will spread the incident conical beam to an output angulation of about 70°. A third set of prism ribs having included half angles of 71° will spread the incident beam to an output angulation of about 50°.

The three sets of prism ribs are used collectively with the three light-emitting diodes so that the individual divergent beams overlap one another to form an essentially single divergent output beam having a beam angle of about 90° in a horizontal plane transverse to the V-shaped ribs, and a beam angle of about 30° in the vertical plane. The overlapping beams from the individual light-emitting diodes add to each other to produce a reasonably even light intensity across the 90° beam angle such that the lamp meets the U.S. Department of Transportation requirements for light intensity and beam divergence.

As previously noted, the various prism ribs are parallel to each other such that the output beams from the individual diodes retain their original divergence in a plane parallel to the ribs, i.e. vertically in the case of a vehicle marker lamp. According to the invention, the prisms are used only to spread the light beams in a horizontal plane transverse to the directions taken by the ribs. The prisms do not spread or otherwise affect the initial divergence of the beams in the vertical plane.

The composite beam generated by the circular lamp of this invention is approximately a rectangular beam having a divergence of about 90° in the horizontal plane and a divergence of about 30° in the vertical plane.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawing, like reference characters designate like parts.

DETAILED DESCRIPTION OF THE PREFERRED EMBODIMENTS

Figure 1:
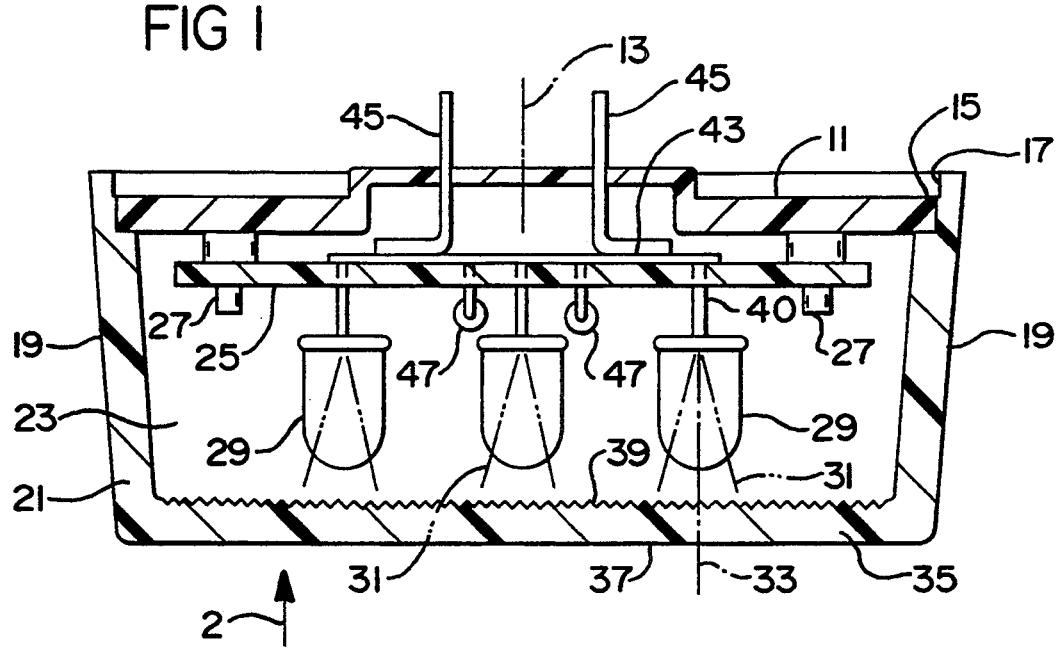
FIG. 1 is a sectional view taken through an automotive marker lamp embodying features of the invention.
Figure 2:
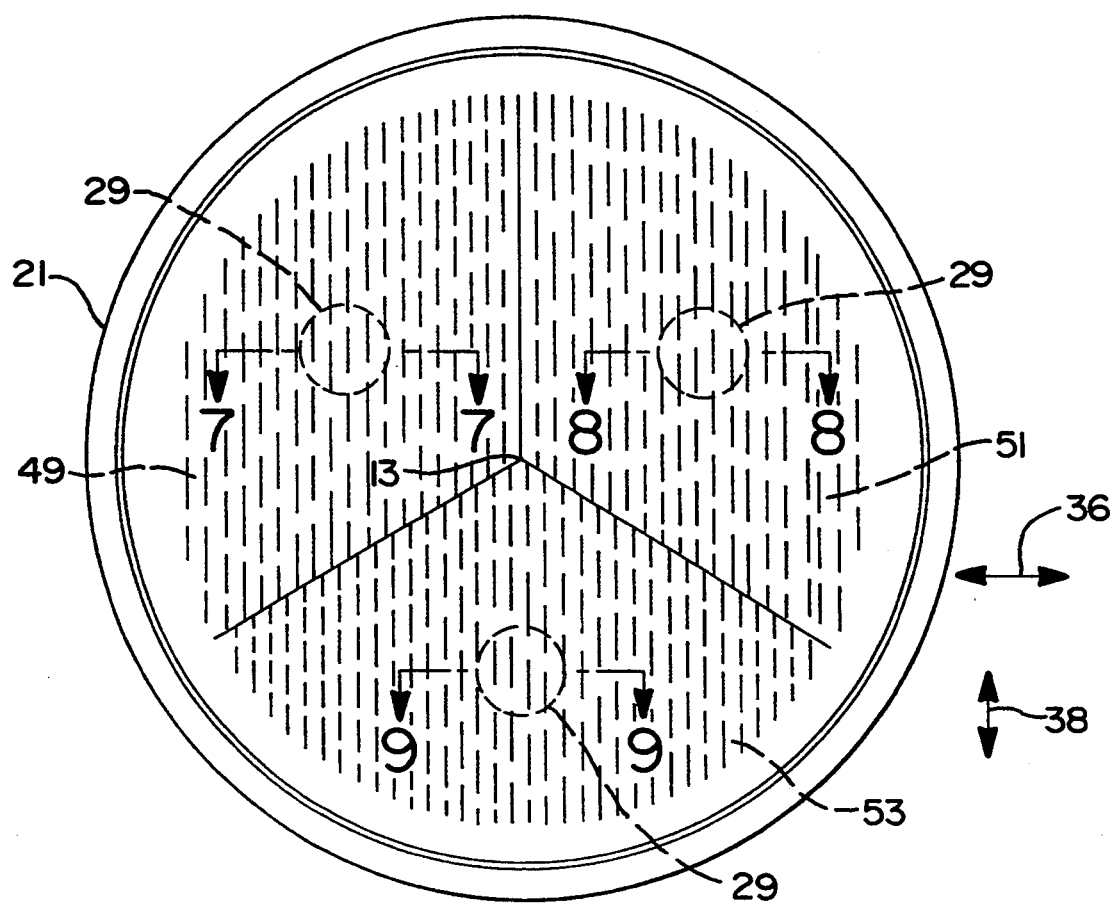
FIG. 2 is a front view of the FIG. 1 lamp taken in the direction of arrow 2 in FIG. 1.
Figure 3:
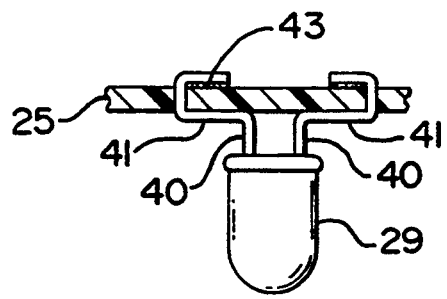
FIG. 3 is a fragmentary view of a diode mounting assembly used in the FIG. 1 lamp.

FIGS. 1 through 3 illustrate a vehicle marker lamp embodying the invention. The lamp includes a circular dielectric base 11 having a central axis 13 seated within an annular recess 17 in the side wall 19 of a cup-shaped lens 21. Edge 15 of the base is sealably joined to wall 19 such as by sonic welding so that the space 23 within lens 21 is sealed against entry of dirt and contaminants.

A printed circuit board 25 is mounted on base 11 via a plurality of integral bosses 27 extending forwardly from the base through holes in the board. Typically, there will be six bosses 27 spaced equidistantly around the circuit board. Each boss has a shoulder engaged with the rear face of board 25. The board can be joined to the bosses by a series of heat staking operations performed on the various bosses.

Three similarly constructed light-emitting diodes 29 are mounted on circuit board 25 so that each diode is equidistant from central axis 13. Each light-emitting diode is oriented so that its conical output beam 31 is centered on an axis 33 that is parallel to the plane of the lens front wall 35. Wall 35 has a flat front surface 37 and a ribbed rear surface 39 such that, when the beam of light generated by each light-emitting diode 29 strikes the ribbed surface, it is refracted by the rib material so as to have an enhanced angulation in a plane transverse to the directions taken by the ribs.

FIG. 2 illustrates the directions of the ribs by reference numeral 38. Numeral 36 references the transverse plane in which the light refraction takes place. Lens 19 is a one-piece transparent plastic molding having three sets of prism ribs integrally formed on the rear surface of front wall 35. The entire lens has a red tint or an amber tint depending on its location on the vehicle. Lens front wall 35 faces away from the vehicle surface on which the marker lamp is mounted.

As further shown in FIG. 2, the three sets of V-shaped ribs collectively cover the entire front wall of the lens. Each set of ribs has a sector shape that takes up approximately one-third of the total ribbed area. Each light-emitting diode 29 is located so that the axis of its output beam is aligned approximately with the centroid of the associated section shaped rib system such that the light intensity is reasonably uniform across the surface of the lens front wall. The V-shaped ribs are formed in the rear surface of the lens front wall so that the front surface of wall 35 is flat and devoid of projections or crevices that could collect dirt or other contaminants that would adversely affect light transmission through the lens.

As illustrated in FIG. 3, each light-emitting diode 29 has two lead wires 40 extending toward circuit board 25 parallel to the diode optical axis, i.e. the axis of the conical output beam 31. The lead wires have right angle bends formed therein such that portions 41 of the lead wires seat flatly against the front surface of circuit board 25. End portions of the lead wires extend through holes in the board and then laterally against printed circuitry 43 on the rear surface of the board.

In one embodiment, the lead wires are soldered to preselected areas of the printed circuit so that the individual light-emitting diodes are connected in electrical parallelism between two current supply terminals 45 of any suitable configuration. It is also possible to arrange two or more LEDs in electrical series between the terminals or two or more pairs or groupings of serially connected, light-emitting diodes in parallel between the terminals. In a preferred practice of the invention, the light-emitting diode current is limited by one or more resistors 47 (FIG. 1) having lead wire connections to the printed circuit 43.

The disposition and construction of lead wires 41 is such that the optical axis 33 of each light-emitting diode is normal to the plane of lens front wall 35. Therefore, light rays emitted by the diodes are refracted or spread equally to the left and to the right during passage through the ribbed prisms formed on lens wall 35.

Figure 7:
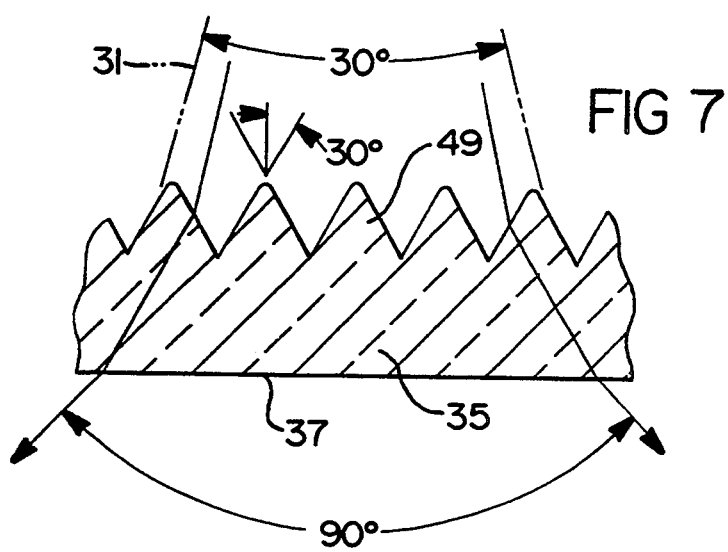
FIGS. 7, 8 and 9 are fragmentary, enlarged sectional views of prism elements used in the marker lamp of FIGS. 1 and 2.
Figure 8:
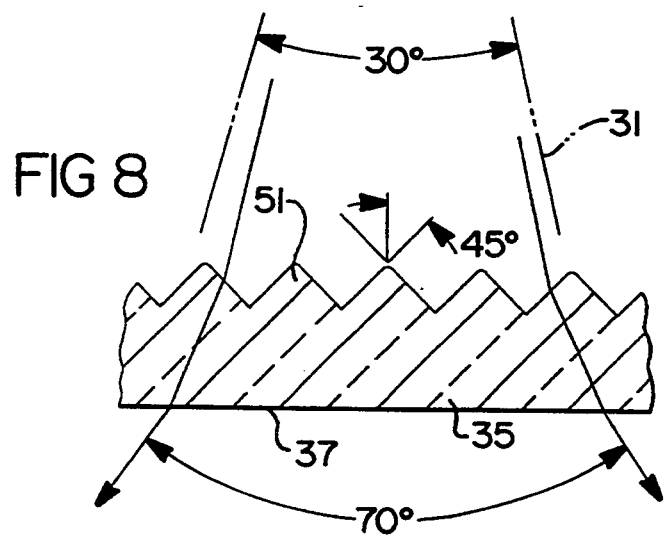
Figure 9:
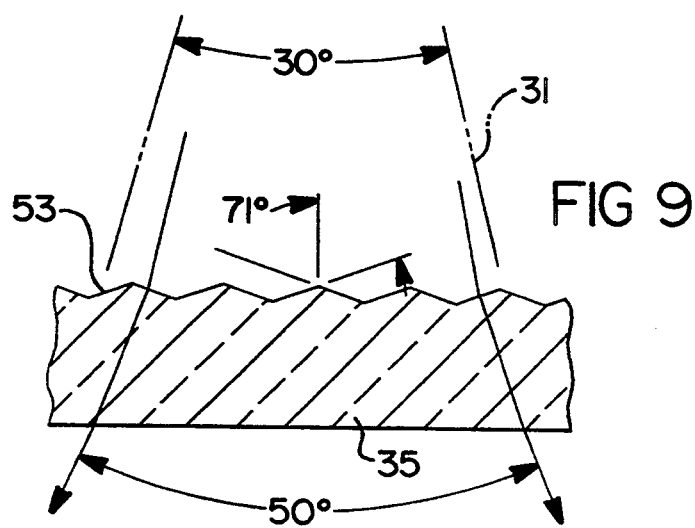

FIGS. 7, 8 and 9 are enlarged fragmentary cross sectional views taken in planes transverse to linear ribs formed on the rear surface of lens front wall 35. There are three different sets of V-shaped ribs, one set for each of the three light-emitting diodes. Each set of V-shaped ribs forms a series of V-shaped prisms having specific included angles such that each set of ribs produces a different angular spreading of the incident light beam. In a preferred practice of the invention, the conical light beam generated by each diode 29 has an included angle measuring approximately 30°.

Referring to FIG. 7, there is shown a lens front wall having a set of V-shaped linear ribs 49. Each linear rib is symmetrical around a mid plane of the rib with a total included angle of 60° or 30° measured in each direction from the rib mid plane. The prism ribs refract the incident light so that the output beam has an angulation of about 90°.

Referring to FIG. 8, there is shown a second set of V-shaped linear ribs 51 wherein each rib is symmetrical around the rib mid plane. The total included angle of each rib is 90°, i.e. 45° measured in each direction from the rib mid plane. The prism rib system of FIG. 8 spreads the incident beam (having an angulation of 30°) so that the output beam has an angulation of about 70°.

Referring to FIG. 9, there is shown a third set of V-shaped linear ribs 53 wherein each rib is symmetrical around the rib mid plane. The total included angle of each rib is 142°, i.e. 71° measured in each direction from the rib mid plane. The prismatic rib system of FIG. 9 spreads the 30° conical incident beam so that the output beam has an angulation of about 50°.

The various ribs 49,51 and 53 are parallel to each other so that the three output beams depicted in FIGS. 7, 8 and 9 are spread only in a plane transverse to the directions taken by the ribs, i.e. the transverse plane designated by numeral 36 in FIG. 2. The conical beam 31 generated by each diode 29 retains its original beam angulation in planes parallel to the ribs, i.e. plane 38 in FIG. 2.

The three output beams emitted from the front surface 37 of lens wall 35 are combined to form a composite beam having a horizontal divergence angle of 90° and a vertical divergence angulation of about 30°, as viewed in FIG. 2. Three light-emitting diodes are used because one diode alone does not produce a beam having the required intensity. The three prismatic rib systems have different prism half angles, 30°, 45° and 71°, so that the individual beams will combine to form a composite beam having a reasonably even intensity over the entire width of the beam.

Figure 4:
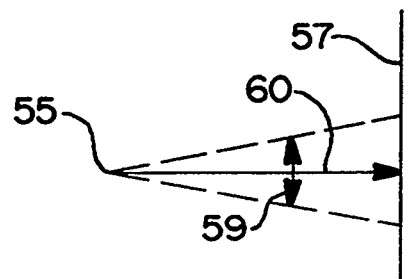
FIG. 4 is a pictorial representation of a light beam directed toward a flat surface, as an illustration of a vehicle marker lamp requirement promulgated by the U.S. Department of Transportation.
Figure 5:
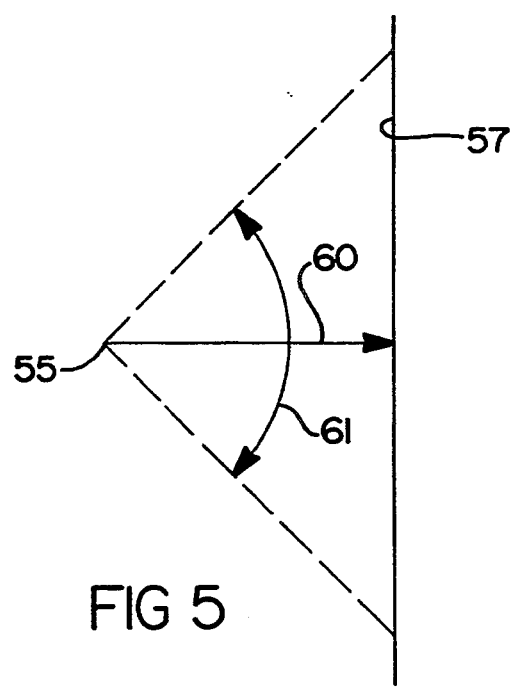
FIG. 5 is a pictorial representation of an additional light beam requirement embodied in the Department of Transportation's marker lamp regulations.
Figure 6:
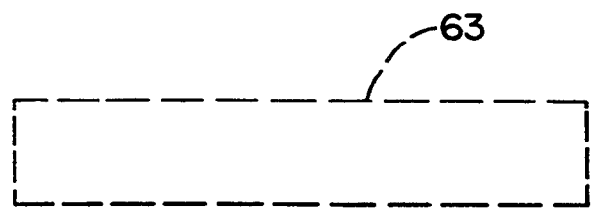
FIG. 6 pictorially illustrates the beam cross section associated with the light beam depicted in FIGS. 4 and 5.

The light beam generated by the FIG. 1 lamp is designed to conform to vehicle marker lamp requirements established by the U.S. Department of Transportation. FIGS. 4, 5 and 6 pictorially illustrate such requirements. FIG. 4 illustrates, in side elevation, a light beam generated by a light source 55 and directed against a flat surface 57 located a specified distance from the source. The beam is required to have a minimum beam angulation 59 of at least 20° in the vertical plane and a minimum intensity on the flat surface 59.

FIG. 5 illustrates, in top plane, the same light beam generated by source 55 and directed against surface 57. In the horizontal plane, the beam is required to have a minimum angulation 61 of at least 90°, 45° above and below optical axis 60. FIG. 6 shows the required beam pattern 63 on surface 57. The required pattern requires a relatively wide beam width in the horizontal direction and a relatively narrow beam width in the vertical direction. The marker lamp depicted in FIGS. 1 through 3 is designed to meet the light beam requirements pictorially illustrated in FIGS. 4 through 6.

Obviously, numerous modifications and variations of the present invention are possible in the light of the above teachings. It is therefore to be understood that within the scope of the appended claims, the invention may be practiced otherwise than as specifically described herein.

What is claimed is:

1. An automotive vehicle marker lamp, comprising:
   a circular base mountable to a vehicle and having a central axis and a peripheral edge;
   a hollow circular cup-shaped lens having an annular circular side wall joined to the peripheral edge of said base and a circular front wall spaced forwardly from said base and having a flat front surface and a rear surface;
   three light-emitting diodes supported by said base equidistant from said central axis, each light-emitting diode having a conical output beam centered on an axis that is normal to the plane of the lens front wall; and
   three sets of light-spreading prism ribs on the rear surface of said lens front wall in respective optical alignment with each light-emitting diode, each set of prism ribs comprising a set of vertically-extending parallel V-shaped ribs formed in the rear surface of the lens front wall, all of said ribs being parallel so that each set of prism ribs spreads the incident light beam in a horizontal plane transverse to the vertically-extending parallel ribs, each light beam being essentially unaffected by said ribs in a vertical plane parallel to the ribs, and the ribs in the different sets of V-shaped ribs having different included angles so that each set of ribs produces a different angular spreading of the incident light beam.

2. The marker lamp of claim 1, wherein the V-shaped ribs define minimum included half angles of at least 30°.

3. The marker lamp of claim 2, wherein the maximum included half angle of the V-shaped ribs is approximately 71°.

4. The marker lamp of claim 1, wherein each set of V-shaped ribs covers a sector of the lens front wall generated from said central axis, said sectors being contiguous whereby the ribs collectively cover the entire front wall of the lens.

5. The marker lamp of claim 4, wherein each light-emitting diode is located so that its output beam axis is aligned with the centroid of the associated sector of V-shaped ribs.

6. The marker lamp of claim 1, wherein the conical output beam of each light-emitting diode has an included angle measuring approximately 30°.

7. The marker lamp of claim 1, and further comprising a printed circuit board located forwardly from said base; said light-emitting diodes having lead wires extending through said board; said base having a multiplicity of integral posts extending forwardly through the printed circuit board for positioning the board within a space circumscribed by the cup-shaped lens.

8. The marker lamp of claim 7, wherein each diode has two lead wires, each lead wire extending toward the circuit board parallel to the diode optical axis then along the board surface normal to the diode optical axis and then through the board, whereby each diode has its optical axis extending normal to the plane of the circuit board.

9. An automotive marker lamp mountable on an automotive vehicle, comprising:
   a circular base;
   a circular cup-shaped lens having an annular side wall joined to said base and comprising a front wall spaced forwardly from said base, said front wall having a flat front surface and a rear surface;
   at least three light-emitting diodes supported by said base for emitting light through said lens; and
   a plurality of sets of light-spreading prisms provided on the rear surface of the lens front wall and respectively aligned with each light-emitting diode, each prism set comprising a set of vertically-extending parallel ribs formed in the lens and each prism means defining a sector shape, said ribs being parallel so that each prism set spreads the light from said light emitting diodes in a horizontal plane transverse to the vertically-extending parallel ribs, the ribs in the different sets of ribs having different included angles so that each set of ribs produces a different angular spreading of the light without substantially spreading said light vertically in a direction parallel to said ribs.

* * * * *